United States Patent [19]

Messing

[11] 4,321,141
[45] Mar. 23, 1982

[54] METHOD FOR PROCESSING WASTE

[75] Inventor: Ralph A. Messing, Horseheads, N.Y.

[73] Assignee: Corning Glass Works, Corning, N.Y.

[21] Appl. No.: 139,228

[22] Filed: Apr. 11, 1980

Related U.S. Application Data

[60] Division of Ser. No. 44,505, Jun. 1, 1979, abandoned, which is a continuation-in-part of Ser. No. 880,779, Feb. 24, 1978, abandoned.

[51] Int. Cl.³ .............................................. C02F 3/30
[52] U.S. Cl. .................................. 210/603; 210/615; 210/630; 435/176
[58] Field of Search ............... 210/603, 605, 615–618, 210/630, 150, 151; 435/176

[56] References Cited

U.S. PATENT DOCUMENTS

| 3,580,840 | 5/1971 | Uridil | 210/611 |
| 3,929,630 | 12/1975 | Smith | 210/617 |
| 4,067,801 | 1/1978 | Ishida et al. | 210/603 |
| 4,127,447 | 11/1978 | Griffith et al. | 210/631 X |
| 4,153,510 | 5/1979 | Messing et al. | 435/176 |
| 4,221,657 | 9/1980 | Lebesgue | 210/616 |

Primary Examiner—Thomas G. Wyse
Attorney, Agent, or Firm—William E. Maycock

[57] ABSTRACT

A method for processing biodegradable organic waste in an aqueous medium, which method comprises serially passing an organic waste-containing aqueous medium through a first, hydrolytic redox bioreactor and a second, anaerobic bioreactor, with each bioreactor containing immobilized microbes. The disclosure also provides an apparatus and process for determining the biochemical oxygen demand of an organic waste in an aqueous medium.

39 Claims, 2 Drawing Figures

METHOD FOR PROCESSING WASTE

CROSS-REFERENCE TO RELATED APPLICATION

This is a division of application Ser. No. 44,505, filed June 1, 1979, now abandoned, which is a continuation-in-part of application Ser. No. 880,779, filed Feb. 24, 1978, now abandoned. The processing method and apparatus described and claimed herein also are described, but not claimed, in copending and commonly-assigned application Ser. No. 41,017, filed May 21, 1979, now abandoned, which is a continuation-in-part of application Ser. No. 880,778, filed Feb. 24, 1978 in the name of Ralph A. Messing, now abandoned.

BACKGROUND OF THE INVENTION

This disclosure pertains to organic waste processing. More particularly, this disclosure pertains to a method and apparatus for processing biodegradable organic waste in an aqueous medium. The disclosure also pertains to an apparatus and process for determining the biochemical oxygen demand (BOD) of an organic waste in an aqueous medium.

A variety of methods for the disposal of organic waste, either industrial or agricultural, are available. Some of these methods, such as burial, land-fill, dumping at sea, and the like, have a negative environmental impact and are not desirable. On the other hand, methods are available for converting organic waste to a source of energy and/or a usable product and include, among others, biological aerobic fermentation, biological anaerobic fermentation, thermophilic aerobic digestion, destructive distillation (including hydrocarbonization and pyrolysis), and incineration. W. J. Jewell et al., "Methane Generation from Agricultural Wastes:-Review of Concept and Future Applications", Paper No. NA74-107, presented at the 1974 Northeast Regional Meeting of the American Society of Agricultural Engineers, West Virginia University, Morgantown, West Virginia, Aug. 18-21, 1974. Of this latter group, biological anaerobic fermentation appears to be the most promising and has received considerable attention in recent years.

Current interest in biological anaerobic fermentation appears to be due, at least in part, to the development of the anaerobic filter. See, for example, J. C. Young et al., *Jour. Water Poll. Control Fed.*, 41, R160 (1969); P. L. McCarty, "Anaerobic Processes", a paper presented at the Birmingham Short Course on Design Aspects of Biological Treatment, International Association of Water Pollution Research, Birmingham, England, Sept. 18, 1974; and J. C. Jennett et al., *Jour. Water Poll. Control Fed.*, 47, 104 (1975). The anaerobic filter basically is a rock-filled bed similar to an aerobic trickling filter. In the anaerobic filter, however, the waste is distributed across the bottom of the filter. The flow of waste is upward through the bed of rocks so that the bed is completely submerged. Anaerobic microorganisms accumulate in the void spaces between the rocks and provide a large, active biological mass. The effluent typically is essentially free of biological solids. See J. C. Young et al., supra at R160.

The anaerobic filter, however, is best suited for the treatment of water-soluble organic waste. J. C. Young et al., supra at R160 and R171. Furthermore, very long retention times of the waste in the filter are required in order to achieve high reductions in the chemical oxygen demand (COD) of the waste to be treated. That is, depending upon the COD of the waste stream, reductions in such COD of from 36.7 percent to 93.4 percent required retention times of from 4.5 hours to 72 hours. J. C. Young et al., supra at R167. In addition, such results were achieved with optimized synthetic wastes which were balanced in carbon, nitrogen, and phosphorus content and which had carefully adjusted pH values.

Accordingly, there remains a great need for a waste processing method which can tolerate the presence of solids in the waste stream and which can more rapidly process the waste on an "as is" basis.

SUMMARY OF THE INVENTION

In accordance with the present invention, there is provided a method for processing biodegradable organic waste in an aqueous medium which comprises serially passing an organic waste-containing aqueous medium through a first immobilized microbe bioreactor and a second immobilized microbe bioreactor, in which:

A. the first bioreactor is a hydrolytic redox bioreactor containing a porous inorganic support which is suitable for the accumulation of a biomass, and B. the second bioreactor is an anaerobic bioreactor containing a porous inorganic support which is suitable for the accumulation of a biomass.

If desired, however, the second bioreactor can be an anaerobic bioreactor comprising a controlled-pore, hydrophobic inorganic membrane which contains a porous inorganic support which is suitable for the accumulation of a biomass.

Also in accordance with the present invention, there is provided an apparatus for processing biodegradable organic waste in an aqueous medium which comprises a first immobilized microbe bioreactor serially connected to a second immobilized microbe bioreactor, in which:

A. the first bioreactor is a hydrolytic redox bioreactor containing a porous inorganic support which is suitable for the accumulation of a biomass, and B. the second bioreactor is an anaerobic bioreactor containing a porous inorganic support which is suitable for the accumulation of a biomass.

Again, if desired, the second bioreactor can be an anaerobic bioreactor comprising a controlled-pore, hydrophobic inorganic membrane which contains a porous inorganic support which is suitable for the accumulation of a biomass.

The present invention also provides an apparatus for the determination of the biochemical oxygen demand of an organic waste in an aqueous medium which comprises a sampling and/or sensing means serially connected to an immobilized microbe bioreactor which in turn is serially connected to a sampling and/or sensing means, in which the bioreactor is an aerobic bioreactor containing a porous inorganic support which is suitable for the accumulation of a biomass.

The present invention further provides a method for the determination of the biochemical oxygen demand of an organic waste in an aqueous medium which comprises serially passing an organic waste-containing aqueous medium through a first sampling and/or sensing means, an immobilized microbe bioreactor, and a second sampling and/or sensing means, in which the bioreactor is an aerobic bioreactor containing a porous inorganic support which is suitable for the accumulation of a biomass.

BRIEF DESCRIPTION OF THE DRAWINGS

The drawings illustrate two embodiments of the present invention as described by Examples 1 and 2, and Examples 4–7, respectively, which embodiments comprise treating sewage or other waste to give an effluent having a significantly reduced oxygen demand and methane as a gaseous product.

DETAILED DESCRIPTION OF THE INVENTION

Figure 1:
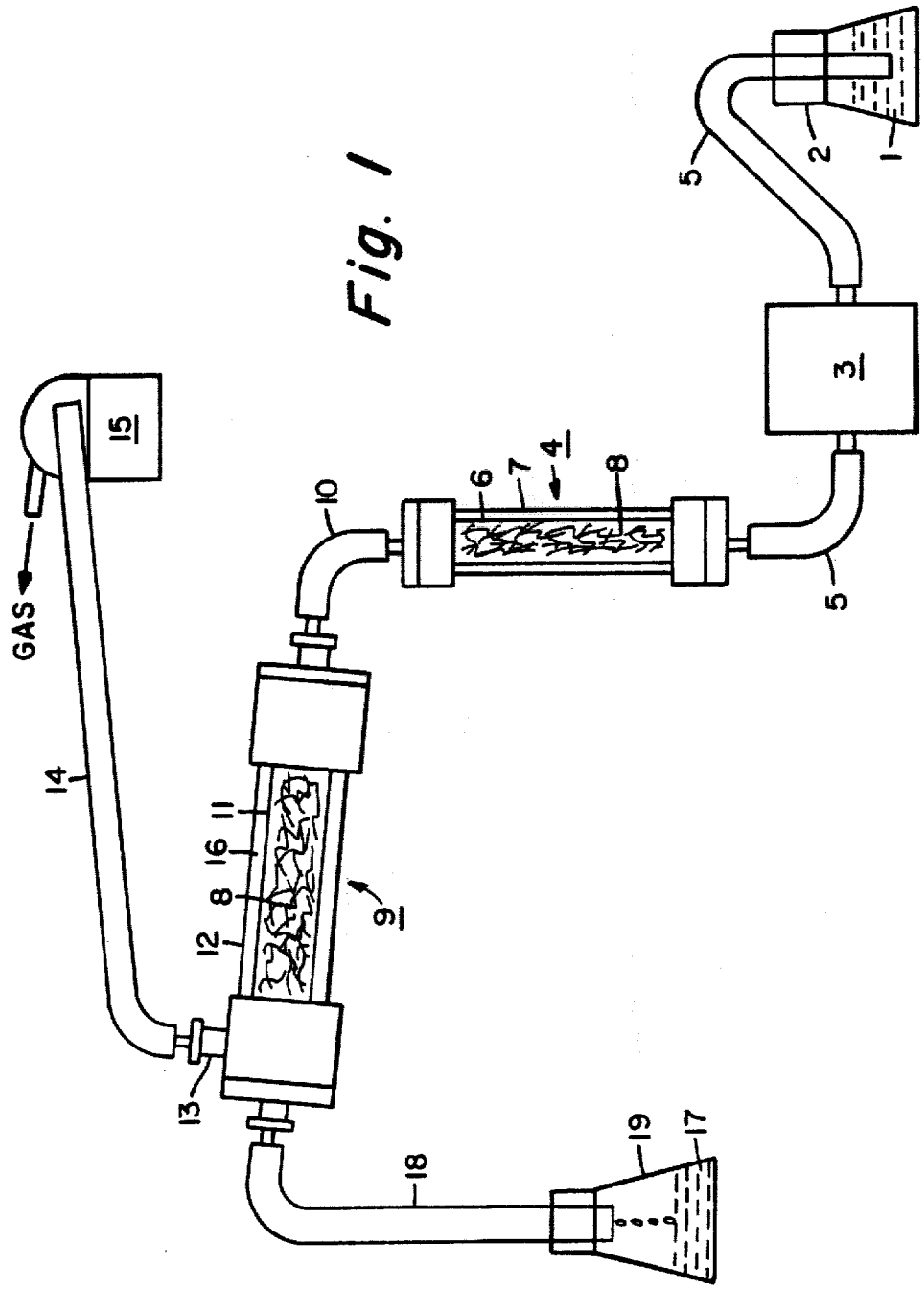

As used herein, the term "biodegradable" means only that at least some of the organic waste to be treated must be capable of being degraded by microorganisms. As a practical matter, at least about 50 percent by weight of the organic waste usually will be biodegradable. It may be necessary or desirable, however, to utilize in the processing method of the present invention waste having substantially lower levels of biodegradable organic matter.

Thus, the organic waste or the aqueous medium containing such waste can contain non-biodegradable organic matter and inorganic materials, provided that the organic waste and aqueous medium are essentially free of compounds having significant toxicity toward the microbes present in either reactor.

In general, the nature of the aqueous medium is not critical. In most instances, water will constitute at least about 50 percent by weight of the medium. Preferably, water will constitute from about 80 to about 98 percent by weight of the aqueous medium.

Frequently, the waste stream to be treated by the processing method of the present invention can be used without any pretreatment. Occasionally, it may be desirable or necessary to dilute the waste stream with water, to separate from the waste stream excessive amounts of solids or excessively coarse solids which might interfere with the pumping equipment necessary to move the aqueous medium through the processing apparatus of the present invention, or to increase the pH of the aqueous medium by, for example, the addition of an inorganic or organic base, such as potassium carbonate, sodium hydroxide, triethylamine, and the like. Alternatively, solid or essentially nonaqueous organic waste can be diluted with water as desired.

The term "bioreactor", as used herein, is a contraction of "biochemical reactor" and, therefore, means that the chemical transformations or conversions taking place therein are carried out by living organisms. The term "immobilized microbe bioreactor" is used to identify such living organisms as microbes which are in an immobilized state (as that term is used by those having ordinary skill in the art).

As already indicated, both the first and second bioreactors of the processing method and apparatus of the present invention contain a porous inorganic support which is suitable for the accumulation of a biomass. In the case of the second bioreactor, the inorganic support optionally is contained within a controlled-pore, hydrophobic inorganic membrane.

As a matter of convenience, the inorganic support in the two bioreactors will be of the same type, although such is not required. Preferably, the inorganic support in each bioreactor is a porous, high surface area inorganic support which is suitable for the accumulation of a high biomass surface within a relatively small volume. More preferably, at least 70 percent of the pores of the inorganic support will have diameters at least as large as the smallest major dimension, but less than about five times the largest major dimension, of the microbes present in the bioreactor. Most preferably, the average diameter of the pores of the inorganic support is in the range of from about 0.8 to about 220$\mu$.

As used herein, the expression "high surface area inorganic support" means an inorganic support having a surface area greater than about 0.01 m$^2$ per gram of support. In general, surface area is determined by inert gas adsorption or the B.E.T. method; see, e.g., S. J. Gregg and K. S. W. Sing, "Adsorption, Surface Area, and Porosity", Academic Press, Inc., New York, 1967. Pore diameters, on the other hand, are most readily determined by mercury intrusion porosimetry; see, e.g., N. M. Winslow and J. J. Shapiro, "An Instrument for the Measurement of Pore-Size Distribution by Mercury Penetration", ASTM Bulletin No. 236, Feb. 1959.

The inorganic support in general can be either siliceous or nonsiliceous metal oxides and can be either amorphous or crystalline. Examples of siliceous materials include, among others, glass, silica, halloysite, kaolinite, cordierite, wollastonite, bentonite, and the like. Examples of nonsiliceous metal oxides include, among others, alumina, spinel, apatite, nickel oxide, titania, and the like. The inorganic support also can be composed of a mixture of siliceous and nonsiliceous materials, such as alumina-cordierite. Cordierite and clay (i.e., halloysite and/or kaolinite) materials such as those employed in the examples are preferred.

For a more complete description of the inorganic support, see application Ser. No. 833,278, filed Sept. 14, 1977, in the names of Ralph A. Messing and Robert A. Oppermann, now U.S. Pat. No. 4,153,510.

As already indicated, the inorganic support in each bioreactor provides a locus for the accumulation of microbes. The porous nature of the support not only permits the accumulation of a relatively high biomass per unit volume of bioreactor but also aids in the retention of the biomass within each bioreactor.

As used herein, the term "microbe" (and derivations thereof) is meant to include any microorganism which degrades organic materials, e.g., utilizes organic materials as nutrients. This terminology, then, also includes microorganisms which utilize as nutrients one or more metabolites of one or more other microorganisms. Thus, the term "microbe", by way of illustration only, includes algae, bacteria, molds, and yeasts. The preferred microbes are bacteria, molds, and yeasts, with bacteria being most preferred.

In general, the nature of the microbes present in each bioreactor is not critical. It is only necessary that the biomass in each bioreactor be selected to achieve the desired results. Thus, such biomass can consist of a single microbe species or several species, which species can be known or unknown (unidentified). Furthermore, the biomass in each bioreactor need not be strictly aerobic or strictly anaerobic, provided that the primary functions of the two bioreactors are consistent with their designations as hydrolytic redox and anaerobic bioreactors, respectively. The term "primary function" as used herein means that at least 50 percent of the biomass in each bioreactor functions in accordance with the reactor designation.

Stated differently, the demarcation line or zone between a hydrolytic redox function and an anaerobic function is not critical and need not always lie between the two reactors. In practice, such demarcation line or zone can vary from the midpoint of the first bioreactor to the midpoint of the second bioreactor and to some extent can be controlled by regulating the amount of suitable combinations of microbes which will yield the indicated product.

| Hydrolytic Redox Bioreactor | Anaerobic Bioreactor | Product |
|---|---|---|
| *Acetobacter aceti* | *Methanobacterium soehngenii* | Methane |
| *Acetobacter peroxydans* | *Methanobacterium formicicum* | Methane |
| *Acetobacter pasteurianus* | *Methanococcus mazei* | Methane |
| *Propionibacterium acidi-propionici* | *Methanobacterium thermoautrophicum* | Methane |
| *Bacillus macerans* | *Methanobacterium ruminantium* | Methane |
| *Bacillus acetoethylicus* | *Methanobacterium mobile* | Methane |
| *Erwinia dissolvens* | *Methanosarcina methanica* | Methane |
| *Escherichia coli* | *Methanosarcina barkeri* | Methane |
| *Klebsiella pneumoniae* | *Methanococcus mazei* | Methane |
| *Trichoderma viride* | *Methanococcus vannielii* | Methane |
| *Asprigillus niger* | *Propionibacterium acidi-propionici* | Methane |
| *Saccharomyces cerevisiae* | *Saccharomyces cerevisiae* | Ethanol |
| *Saccharomyces ellipsoideus* | *Saccharomyces ellipsoideus* | Ethanol |
| *Aspergillus niger* | *Clostridium propionicum* | Propanol |
| *Trichoderma viride* | *Clostridium saccharoacetoper-butylicum* | Butanol |
| *Escherichia coli* | *Clostridium butyricum* | Hydrogen | oxygen dissolved in the waste stream.

As used herein, the term "hydrolytic redox" refers to the function of the first bioreactor which is to break down any macromolecules present into smaller units, e.g. monomers and oligomers, by hydrolysis and oxidation-reduction reactions. In so doing, the first bioreactor also serves to deplete the aqueous medium of dissolved oxygen.

It should be apparent, therefore, that the first bioreactor is not an aerobic bioreactor as the term "aerobic" is used in the prior art. The aqueous medium is not aerated continuously or even saturated with air or oxygen. Because residual oxygen in the medium is depleted, however, at least some oxidation-reduction occurs aerobically.

Examples of microbes which can be employed in the hydrolytic redox bioreactor include, among others, strict aerobic bacteria such as *Pseudomonas fluorescens, Acinetobacter calcoaceticus*, and the like; facultative anaerobic bacteria such as *Escherichia coli, Bacillus subtilis, Streptococcus faecalis, Staphylococcus aureus, Salmonella typhimurium, Klebsiella pneumoniae, Enterobacter cloacae, Proteus vulgaris*, and the like; anaerobic bacteria such as *Clostridium butyricum, Bacteroides frazilis, Fuscobacterium necrophorum, Leptotrichia buccalis, Veillonella parvula, Methanobacterium formicicum, Methanococcus mazei, Methanosarcina barkeri, Peptococcus anaerobius, Sarcina ventriculi*, and the like; molds such as *Trichoderma viride, Aspirgillus niger*, and the like; and yeasts such as *Saccharomyces cerevisiae, Saccharomyces ellipsoideus*, and the like. Obviously, the hydrolytic redox bioreactor should not contain either strict aerobes or strict anaerobes only.

Examples of microbes which can be utilized in the anaerobic bioreactor include, among others, facultative anaerobic bacteria, anaerobic bacteria, and yeasts such as those listed above. Of course, the anaerobic bioreactor should not contain strict aerobes only, although the presence of such microbes usually is not harmful.

As already pointed out, the microbes employed in each bioreactor are selected on the basis of the results desired. If a particular product is not required, the choice of microbes can be made on the basis of waste conversion efficiency, operating parameters such as temperature, flow rate, and the like, microbe availablity, microbe stability, or the like. If, on the other hand, a particular product is desired, the microbes typically are selected to maximize production of that product. By way of illustration only, the table below indicates some In general, the microbes are introduced into each bioreactor in accordance with conventional procedures. For example, the bioreactor can be seeded with the desired microbes, typically by circulating an aqueous microbial suspension through the bioreactor. Alternatively, the microbes can be added to the waste stream at any desired point. In cases where the waste stream already contains the appropriate types of microbes, the passage of such waste through two bioreactors will in due course establish the requisite microbe colonies therein. Of course, the bioreactors can be assembled using inorganic support having microbes immobilized thereon.

The second bioreactor optionally contains a controlled-pore, hydrophobic inorganic membrane. As used herein, the term "membrane" refers to a continuous, formed article, the shape and dimensions of which are adapted to process requirements. Thus, the membrane can be a flat or curved sheet, a three-dimensional article such as a rectangular or cylindrical tube, or a complex monolith having alternating channels for gas and aqueous medium. As a practical matter, the membrane most often will consist of a cylinder, open at both ends to provide passage of aqueous medium through its length. Wall thickness is not critical, but must be sufficient to permit the membrane to withstand process conditions without deformation or breakage. In general, a wall thickness of at least about 1.0 mm is desired.

The membrane can be either siliceous or nonsiliceous metal oxides. Examples of siliceous materials include, among others, glass, silica, wollastonite, bentonite, and the like. Examples of nonsiliceous metal oxides include, among others, alumina, spinel, apatite, nickel oxide, titania, and the like. Siliceous materials are preferred, with glass and silica being most preferred. Of the nonsiliceous metal oxides, alumina is preferred.

The membrane must have a controlled porosity such that at least about 90 percent of the pores have diameters of from about 100Å to about 10,000Å. Preferably, the pore diameter range will be from about 900Å to about 9,000Å, and most preferably from about 1,500Å to about 6,000Å.

Methods of preparing inorganic membranes having controlled porosity as described above are well known to those having ordinary skill in the art and need not be discussed in detail here. See, e.g., U.S. Pat. Nos. 2,106,764, 3,485,687, 3,549,524, 3,678,144, 3,782,982, 3,827,893, 3,850,849, and 4,001,144, British Patent Specification No. 1,392,220, and Canadian Pat. No. 952,289. In addition, various porous inorganic materials are commercially available which can be formed into shaped articles by known methods. Among suppliers of such porous inorganic materials are the following: Alcoa, Catalytic Chemical Co. Ltd., Coors, Corning Glass Works, Davison Chemical, Fuji Davison Co. Ltd., Harrisons & Crosfield (Pacfic) Inc., Kaiser Chemicals, Mizusawa Kagaku Co. Ltd., (Chemical Division), and Shokubai Kasei Co. Ltd.

As a second requirement, in addition to controlled porosity, the inorganic membrane must be hydrophobic. Since the inorganic materials of which the membrane usually is composed are not inherently hydrophobic, the property of hydrophobicity normally must be imparted to the membrane by treating it either before or after the membrane is shaped or formed. As a practical matter, such treatment will be a post-formation treatment. The nature of the treatment is not critical, and essentially any treatment can be employed which will render the membrane hyrophobic. The property of hydrophobicity, however, must be imparted throughout the entire void volume of the membrane, and not just to the external surface areas.

Hydrophobocity is most conveniently imparted to the shaped or formed membrane by immersing the membrane in an organic solvent which contains dissolved therein a suitable hydrophobic reagent, removing the membrane from the solvent, and allowing it to air dry. Although the concentration of the reagent is not critical, an especially useful concentration range has been found to be from about 3 to about 25 percent, weight per volume of solvent. A most convenient concentration is 10 percent. Essentially any solvent in which the hydrophobic reagent is soluble can be employed. Examples of suitable solvents include, among others, hexane, cyclohexane, diethyl ether, acetone, methyl ethyl ketone, benzene, toluene, the xylenes, nitrobenzene, chlorobenzene, bromobenzene, chloroform, carbon tetrachloride, and the like. Examples of suitable hydrophobic reagents include, among others, natural waxes such as spermaceti, beeswax, Chinese wax, carnauba wax, and the like; synthetic waxes such as cetyl palmitate, cerotic acid, myricyl palmitate, ceryl cerotate, and the like; aliphatic hydrocarbons such as octadecane, eicosane, docosane, tetracosane, hexacosane, octacosane, triacontane, pentatriacontane, and the like; polycyclic aromatic hydrocarbons such as naphthalene, anthracene, phenanthrene, chrysene, pyrene, and the like; polybasic acids such as Empol Dimer Acid and Empol Trimer Acid (Emery Industries, Inc.); polyamide resins such as the Emerex Polyamide Resins (Emery Industries, Inc.); water-insoluble polymeric isocyanates such as poly(methylenephenylisocyanate) which is commercially available as PAPI (Upjohn Company); alkylhalosilanes such as octadecyltrichlorosilane, di(dodecyl)difluorosilane, and the like; and similar materials. The alkyhalosilanes are preferred, with octadecyltrichlorosilane being most preferred.

From the foregoing, it should be apparent to one having ordinary skill in the art that essentially any hydrophobic reagent which will adhere to the inorganic membrane with a reasonable degree of permanence can be employed. Such adherence can be by purely physical means, such as van der Waals attraction, by chemical means, such as ionic or covalent bonding, or by a combination of physical and chemical means.

It also should be apparent to one having ordinary skill in the art that the configurations of the two bioreactors are not critical to either the processing method or the apparatus of the present invention. Thus, the present invention comprehends any configuration which is not inconsistent with the instant disclosure. Most often, each bioreactor will be a conventional cylindrical or tubular plug flow-type reactor, such as those described in the examples. Accordingly, each bioreactor typically comprises a cylinder or tube open at both ends which contains the inorganic support. Typically, such cylinder is composed of any suitable material which is impervious to both gases and liquids. Suitable materials include, among others, glass, stainless steel, glass-coated steel, poly(tetrafluoroethylene), and the like. Each bioreactor optionally is jacketed. The jacket, if present, can be constructed from any of the usual materials, such as those listed for the bioreactors.

It will be appreciated by those having ordinary skill in the art that when evolved gaseous products are to be contained or otherwise handled, the configuration of the second bioreactor must be appropriately designed. Such design requirements, however, are well understood by those having ordinary skill in the art.

In the case of the second bioreactor, the bioreactor or cylinder optionally comprises the controlled-pore, hydrophobic inorganic membrane. The bioreactor still can be, and preferably is, jacketed, especially when it is either necessary or desirable to contain, isolate, analyze, utilize, or otherwise handle gaseous products evolved during the processing method of the present invention.

In more general terms, each bioreactor normally will be shaped in such a manner as to provide one or more channels for the passage of a fluid. Where multiple channels are provided, such channels can provide independent flow of the fluid through such channels or they can be serially connected. The aqueous medium can flow through such channels or around such channels. Thus, the inorganic support can be contained in such channels or located around such channels. For example, given the cylindrical bioreactor already described, the inorganic support can be obtained within the cylinder or tube. Alternatively, the cylinder or tube can be jacketed and the inorganic support can be located between the jacket and the cylinder or tube. Hence, the aqueous medium can flow either through or around the cylinder or tube.

When the inorganic membrane is used in the second bioreactor, gaseous products will pass from or into the cylindrical membrane, depending upon whether the aqueous medium passes through or around the cylindrical membrane. When the inorganic membrane is not used, gaseous products simply pass from the bioreactor liquid phase to a vapor or gas phase.

Gaseous product removal, of course, is readily achieved by the various means known to those having ordinary skill in the art. Typically, the gaseous products are simply pumped away from the second bioreactor. That is, the gas space of the second reactor is connected to a gas collection means via a means for maintaining the gas collection means at a pressure which is less than that of the second reactor gas space. Alternatively, when the inorganic membrane is employed in the second bioreactor, a liquid solvent having a high affinity for the gaseous products (i.e., in which the gaseous products have a high degree of solubility) can be circulated about or through the membrane in what normally would be the gas side of the membrane. Suitable solvents for many gases include silicones and fluorocarbons, among others. The use of such a gas solvent usually is neither necessary nor desired and, therefore, is not preferred. Since the processing method and apparatus of the present invention are well-suited for the production of usable gases, it is preferred that the second bioreactor have a gas removal means attached thereto. When an inorganic membrane is employed, it is preferred that the second bioreactor is sealably enclosed within a jacket having a gas removal means attached thereto.

While process temperatures are critical only to the extent that the microbes present in each reactor remain viable, as a practical matter the process of the present invention will be carried out at a temperature of from about 10° C. to about 60° C. Under normal circumstances when the inorganic membrane is used in the second reactor, both reactors are maintained at ambient temperature. When the inorganic membrane is not employed, the first reactor preferably is maintained at an elevated temperature, i.e., a temprature above ambient temperature. The preferred temperature range for the first reactor under such circumstances is from about 30° C. to about 40° C.

As already indicated, the waste stream to be treated by the processing method of the present invention frequently can be used without any pretreatment. Whether or not pretreatment is required is determined largely by the results expected. By way of illustration only, various of the examples describe the treatment of sewage or other waste to give an effluent having a significantly reduced chemical oxygen demand and methane as a principal product. Because the methane thus produced can be employed as a fuel, it is desired to minimize the production of non-fuel gaseous by-products, such as carbon dioxide. Accordingly, no pretreatment of, e.g., sewage is necessary when the anaerobic bioreactor utilizes an inorganic membrane. That is, the use of the membrane frequently results in the production of methane with less than five percent carbon dioxide content. In order to keep carbon dioxide in the methane at acceptably low levels when the membrane is not used, however, it is necessary to adjust the pH of the sewage to about 8 or above. This pH adjustment serves primarily to keep the carbon dioxide, produced by the microbes, in solution. Thus, various of the examples illustrate two preferred embodiments of the process of the present invention, one of which utilizes an inorganic membrane in the anaerobic bioreactor, and the other of which does not.

The present invention also provides an apparatus for the determination of the biochemical oxygen demand (BOD) of a biodegradable organic waste in an aqueous medium. Such apparatus comprises a sampling and/or sensing means serially connected to an aerobic bioreactor, which bioreactor in turn is serially connected to a sampling and/or sensing means.

As used herein, the term "sampling and/or sensing means" is meant to include a sampling means, a sensing means, and a sampling and sensing means.

Accordingly, the sampling and/or sensing means can be nothing more than a port, fitted with, for example, a stopcock or rubber septum, to provide a means for the manual withdrawal of a sample from the waste stream. Alternatively, such sampling means can be an automated sampling device which automatically removes samples of a precise size at predetermined intervals and stores such samples for future handling or analysis.

Examples of suitable sensing means include, among others, dissolved oxygen sensor, conductivity sensor, ammonium ion sensor, pH electrode, and the like. Actually, any sensing means can be used which will detect measurable differences in the organic waste-containing aqueous medium which are the result of the biochemical conversions taking place in the apparatus for determining BOD.

As contemplated by the present invention, a sampling and sensing means can be any combination of a sampling means and a sensing means. For example, an automated sampling device can be serially connected to an automated device for determining COD by a chromic acid oxidation procedure. Other variations and combinations, however, will be readily apparent to one having ordinary skill in the art.

Finally, the two sampling and/or sensing means need not be physically discrete or separate. That is, with appropriate connecting and waste stream directing means, a single sampling and/or sensing means can be employed in the BOD apparatus of the present invention, and such use is within the scope of the instant disclosure. Thus, when using a single sampling and/or sensing means, the waste stream or a portion thereof first is passed through the sampling and/or sensing means. The waste stream then enters the aerobic bioreactor. Upon exiting the aerobic bioreactor, the waste stream or a portion thereof is directed to the sampling and/or sensing means by appropriate connecting and directing means which are well known to those having ordinary skill in the art.

As a practical matter, it is advisable to avoid the use of a sampling means which can only add to the complexity and cost of the BOD apparatus. Thus, the use of a sensing means only is preferred, and the use of a dissolved oxygen sensor is most preferred.

Whether or not the sensing means measures dissolved oxygen, excess oxygen must be present in the aqueous medium since the apparatus depends upon aerobic microbial conversions for the determination of BOD. Thus, the bioreactor is an aerobic bioreactor and requires microbes capable of functioning aerobically. Thus, the bioreactor cannot contain only strict anaerobes. Accordingly, suitable microbes include those listed for the first bioreactor of the waste processing apparatus, strict anaerobes excluded. Otherwise, the description of such first bioreactor applies equally to the aerobic bioreactor of the BOD apparatus.

The present invention further provides a process for the determination of the biochemical oxygen demand of an organic waste in an aqueous medium which comprises serially passing an organic waste-containing aqueous medium through a first sampling and/or sensing means, an immobilized microbe bioreactor, and a second sampling and/or sensing means, in which the bioreactor is an aerobic bioreactor containing a porous inorganic support which is suitable for the accumulation of a biomass.

In general, the process can be carried out at any temperature at which the microbes remain viable and functional. Practically, the process will be carried out at a temperature of from about 10° C. to about 60° C., with ambient temperature being preferred.

As already indicated, the aqueous medium must contain excess oxygen. That is, the aqueous medium carrying from the aerobic bioreactor must contain at least some dissolved oxygen. The need for excess dissolved oxygen, however, does not require aeration of the aqueous medium. Normal dissolved oxygen levels can be adequate if bioreactor size and medium residence times (flow rates) are appropriately adjusted.

Bioreactor size and medium residence times are not critical and are readily optimized by one having ordinary skill in the art. While medium BOD levels normally are not critical, it should be apparent that (1) higher BOD levels may require serial dilution in order to maintain accuracy and precision, and (2) bioreactor size and medium residence times are variables which must be considered for any given BOD values. By way of illustration, the BOD apparatus described in the examples in general works well for the determination of actual media BOD levels of from about 1 to about 10 ppm (or mg/l) oxygen. With such apparatus, residence times greater than about one hour seldom are required.

The present invention is further described, but not limited, by the following examples which illustrate the use of the processing method and apparatus of the present invention in the treatment of sewage. Unless otherwise stated, all temperatures are in degrees Celsius.

The process employed in Examples 1 and 2 is described below, with reference to FIG. 1.

Sewage 1 is pumped from container 2 by pump 3 to hydrolytic redox bioreactor 4 via rubber tubing 5 sealably connected to the pump and the hydrolytic redox bioreactor. The hydrolytic redox bioreactor consists of inner glass tube 6 sealably enclosed within glass jacket 7. The inner glass tube contains inorganic carrier 8 such as that described in U.S. Pat. No. 4,153,510, which is suitable for the accumulation of a biomass. Sewage leaving the hydrolytic redox bioreactor is transported to anaerobic bioreactor 9 via rubber tubing 10 sealably connected to both bioreactors. The anaerobic bioreactor consists of inorganic membrane 11 and glass jacket 12 having exit port 13. The inorganic membrane is filled with additional inorganic carrier 8 and is sealably enclosed within the glass jacket. Rubber tubing 14, sealably connected to the exit port of the jacket, leads to pump 15 which removes gas (methane) from air space 16 enclosed by the jacket. Such gas in turn is collected by any suitable means such as by the displacement of water in an inverted vessel (not shown). Sewage effluent 17 then is transported via rubber tubing 18 sealably connected to the anaerobic bioreactor, to receiving vessel 19.

The sewage employed in each of the examples was obtained from the inlet pipe to the Corning, N.Y., Municipal Sewage Waste Treatment Plant. The sewage was stored at 4°-6° C. Prior to use, the sewage was filtered through cheesecloth and glass wool to remove coarse particulate matter. Sewage was collected either weekly or biweekly.

EXAMPLE 1

Pump 3 consisted of a Fluid Metering pump, RP1G6CSC (Fluid Metering, Inc., Oyster Bay, N.Y.), which was connected to hydrolytic redox bioreactor 4 with a 14-inch length of rubber tubing. A 20-inch length of rubber tubing was attached to the intake side of the pump and led from a flask containing sewage.

The hydrolytic redox bioreactor consisted of a Pharmacia K16/20 column (Pharmacia Fine Chemicals, Uppsala, Sweden) with water jacket; the water jacket was left vented to the atmosphere. The column was charged with 24 g. of cordierite (CGZ) carrier having a pore diameter distribution of 2–9$\mu$ and an average pore diameter of 4.5$\mu$. The carrier was seeded with sewage microbes by flowing through the bioreactor sludge obtained previously from a municipal anaerobic digestor.

The inorganic membrane 11 of anaerobic bioreactor 9 was a silica membrane, prepared in accordance with known procedures; see, for example, U.S. Pat. Nos. 3,678,144, 3,782,982, and 3,827,893. The membrane was approximately 18 cm. long with cross-sectional dimensions of 10.5 nm. i.d. and 15.5 mm. o.d. The average pore diameter of the membrane was 3500 Å with a pore diameter distribution of 2000–3600 Å. Wall porosity was 60 percent and pore volume was 0.89 cc/g. The membrane was rendered hydrophobic by placing it in 75 ml. of a ten percent solution of octadecyltrichlorosilane in acetone and allowing it to soak overnight. The membrane then was removed from the solution, washed with 500 ml. of acetone, and air-dried.

The membrane was mounted in a Pharmacia K16/20 water jacket by means of the standard rubber sealing ring and threaded locking ring and was charged with ten g. of the CGZ carrier. Both bioreactors together had a total void or fluid volume of about 30 ml.

The two bioreactors were coupled with about four inches of rubber tubing. One of the ports of the anaerobic bioreactor jacket was sealed by attaching a short piece of Tygon tubing thereto and closing the tubing by means of a clamp. The other port was attached to a Buchler Polystaltic Pump (Buchler Instruments, Inc., Fort Lee, N.J.) with a length of thick-walled Tygon tubing. Gas evolved and passed through the membrane was collected by the displacement of water in a calibrated cylinder inverted in water-filled, large, shallow vessel. The rate of gas evolution was observed and the collected gas was analyzed at least daily by mass spectroscopy. In addition, the chemical oxygen demand (COD) of the sewage used as feed and the effluent emerging from the anaerobic bioreactor were determined periodically by standard, well-known colorimetric dichromate oxidation procedures.

The process was run for a period of about nine months. Although data were generated on a daily basis, except for COD analyses, weekly averages of the data are presented in Table I; in the table, COD analyses are averaged where more than one analysis was obtained per week.

TABLE I

| | | | Summary of Data Obtained in Example 1 | | | | | | | | |
|---|---|---|---|---|---|---|---|---|---|---|---|
| | Feed Rate, | Gas Evolved, | Gas Composition (mole-%) | | | | | COD | | | |
| Week | ml/hr. | ml/hr. | $CH_4$ | $CO_2$ | $O_2$ | $N_2$ | A | In | Out | Reduction | Remarks |
| 1 | 10.4 | 16.0 | 1.1 | 3.8 | 11.8 | 82.2 | 1.1 | — | — | — | |
| 2 | 10.8 | 4.6 | 9.3 | 6.8 | 11.4 | 71.4 | 1.1 | — | — | — | a |
| 3 | 10.8 | 2.5 | 17.8 | 1.4 | 8.6 | 71.3 | 1.0 | — | — | — | b |
| 4 | 10.0 | 0.9 | 44.0 | 2.6 | 5.1 | 47.4 | 0.9 | — | — | — | |
| 5 | 8.5 | 1.7 | 59.8 | 4.9 | 3.5 | 31.2 | 0.6 | — | — | — | c |
| 6 | 22.0 | 1.9 | 57.0 | 4.3 | 3.9 | 34.0 | 0.7 | — | — | — | d |
| 7 | 23.0 | 1.4 | 36.8 | 3.6 | 4.8 | 58.8 | 1.0 | — | — | — | |
| 8 | 23.0 | 2.2 | 56.4 | 3.4 | 3.6 | 35.9 | 0.7 | — | — | — | |

TABLE I-continued
Summary of Data Obtained in Example 1

| Week | Feed Rate, ml/hr. | Gas Evolved, ml/hr. | Gas Composition (mole-%) | | | | | COD | | | Remarks |
| | | | CH₄ | CO₂ | O₂ | N₂ | A | In | Out | Reduction | |
|---|---|---|---|---|---|---|---|---|---|---|---|
| 9  | 22.7 | 1.2 | 39.0 | 2.8  | 4.6  | 52.6 | 1.0 | —    | —   | — |   |
| 10 | 23.0 | 1.6 | 47.1 | 3.1  | 3.6  | 45.4 | 0.9 | —    | —   | — | e |
| 11 | 22.3 | 0.4 | 20.3 | 2.2  | 10.9 | 65.1 | 1.3 | —    | —   | — | f |
| 12 | 22.4 | 0.6 | 23.7 | 3.1  | 37.5 | 64.3 | 1.3 | —    | —   | — | g |
| 13 | 22.7 | 0.6 | 37.2 | 3.1  | 5.9  | 52.7 | 1.2 | —    | —   | — |   |
| 14 | 21.5 | 1.6 | 65.2 | 6.0  | 3.2  | 24.9 | 0.6 | 530  | —   | — |   |
| 15 | 23.2 | 1.0 | 57.2 | 3.6  | 4.4  | 33.9 | 0.9 | —    | —   | — | h |
| 16 | 28.6 | 0.9 | 45.8 | 3.4  | 4.3  | 45.4 | 1.1 | 275  | 115 | 58 | i |
| 17 | 28.3 | 1.2 | 58.5 | 5.9  | 3.9  | 30.8 | 0.9 | 395  | 165 | 58 |   |
| 18 | 28.7 | 1.1 | 54.9 | 5.7  | 4.0  | 34.5 | 0.9 | 550  | 320 | 42 |   |
| 19 | 29.2 | 1.2 | 58.2 | 4.5  | 2.9  | 33.5 | 0.9 | 484  | 200 | 59 | j |
| 20 | 28.1 | 1.5 | 70.5 | 8.9  | 2.8  | 17.1 | 0.6 | 870  | 295 | 66 |   |
| 21 | 28.1 | 1.5 | 71.8 | 7.8  | 3.1  | 16.7 | 0.6 | 960  | 295 | 69 |   |
| 22 | 28.6 | 1.4 | 68.9 | 6.9  | 2.9  | 20.7 | 0.6 | 470  | 175 | 63 |   |
| 23 | 30.8 | 1.2 | 73.8 | 5.1  | 3.4  | 17.2 | 0.6 | —    | —   | — | k |
| 24 | 58.1 | 0.5 | 16.2 | 1.1  | 3.5  | 77.7 | 1.6 | 78   | 78  | 0  |   |
| 25 | 27.0 | 0.7 | 47.4 | 2.9  | 2.7  | 46.1 | 1.0 | 355  | 150 | 58 | l |
| 26 | 26.7 | 1.4 | 64.8 | 14.5 | 0.7  | 19.5 | 0.6 | 690  | 185 | 73 | m |
| 27 | 26.1 | 1.6 | 60.8 | 18.7 | 3.2  | 16.8 | 0.5 | 560  | 190 | 66 |   |
| 28 | 26.1 | 2.5 | 68.8 | 21.8 | 1.9  | 7.3  | 0.3 | 1300 | 360 | 72 |   |
| 29 | 25.3 | 2.0 | 69.1 | 16.0 | 2.6  | 11.9 | 0.4 | 680  | 155 | 77 |   |
| 30 | 23.9 | 2.3 | 69.4 | 21.2 | 1.9  | 7.3  | 0.3 | 790  | 190 | 76 |   |
| 31 | 23.8 | 2.0 | 74.5 | 15.5 | 1.9  | 7.8  | 0.3 | 550  | 180 | 67 |   |
| 32 | 20.1 | 2.1 | 69.1 | 19.2 | 2.5  | 8.9  | 0.3 | 1610 | 335 | 79 |   |
| 33 | 21.4 | 1.8 | 71.9 | 18.2 | 2.2  | 7.5  | 0.3 | 1147 | 307 | 73 |   |
| 34 | 23.4 | 1.4 | 75.5 | 11.4 | 2.3  | 10.4 | 0.4 | —    | —   | — |   | a The anaerobic bioreactor developed a leak in the water jacket gaskets which were then replaced.
b The peristaltic gas pump was adjusted and another leak was stopped.
c The feed pump broke down and was replaced with a Milton Roy Mini-Pump.
d The Milton Roy feed pump was replaced with an original-type Fluid Metering Pump.
e The process was allowed to run continuously, but without monitoring, for the next 17 days.
f The peristaltic gas pump was replaced with a bellows pump. Because of leaks in the bellows pump, the peristaltic gas pump was re-installed two days later. Air was bubbled into the feed for the next week.
g The passage of air into the feed was stopped.
h Water at 31° was circulated through the hydrolytic redox bioreactor water jacket.
i The temperature of the hydrolytic redox bioreactor was increased to 34°.
j The hydrolytic redox bioreactor was returned to ambient temperature operation.
k The feed was changed to primary-treated sewage.
l The feed was changed from primary-treated sewage back to raw sewage.
m A leaking tube in the gas pump was replaced.

EXAMPLE 2

The procedure of Example 1 was repeated, except that the hydrolytic redox bioreactor was charged with 19 g. of CGZ carrier, the carrier in the hydrolytic redox bioreactor was not seeded, the inorganic membrane of the anaerobic bioreactor was an alumina membrane, and the anaerobic bioreactor was charged with 18.4 g. of the CGZ carrier.

The alumina membrane was prepared in accordance with well-known procedures. Briefly, 300 g. of SA alumina containing three percent by weight of carbowax was isostatically pressed at 1,758 kg./cm.² (25,000 psi) in a mold which consisted of a cylindrical mandrel having a diameter of 1.9 cm. and a cylinder with rubber sleeve having an inner diameter of 3.65 cm. The resulting cylindrical tube had the following cross-sectional dimensions: i.d., 1.9 cm., and o.d., 2.62 cm. The tube was turned on a lathe to an o.d. of 2.4 cm. The tube was about 36 cm. in length. The tube then was fired in a furnace as follows: The furnace was heated to 500° (from ambient temperature) at 50° per hour and held at 500° for two hours. The temperature then was increased to 1550° at a first rate of 50° per hour to 950° and a second rate of 100° per hour to 1550°, at which temperature the furnace was held for five hours. The furnace then was cooled at 100° per hour to 950°, and at 50° per hour to ambient temperature. The resulting alumina controlled-pore membrane had an i.d. of 1.43 cm., an o.d. of 1.75 cm., and a wall thickness of 2.0 mm. Pore diameter distribution was from 3500 Å to 4500 Å, with an average pore diameter of 4000 Å. Wall porosity was 46.8 percent and pore volume was 0.22 cc./g. The membrane was rendered hydrophobic by placing it in 50 ml. of acetone containing ten percent octadecyltrichlorosilane and allowing it to react overnight at ambient temperature. The membrane then was removed from the acetone solution and washed four times with 50-ml. portions of acetone. The membrane was air-dried for four hours, and then was heated at 120° for 1.5 hours.

The data obtained from this example are summarized in Table II, again as weekly averages.

TABLE II
Summary of Data in Example 2

| Week | Feed Rate, ml/hr. | Gas Evolved, ml/hr. | Gas Composition (mole-%) | | | | | COD | | | Remarks |
| | | | CH₄ | CO₂ | O₂ | N₂ | A | In | Out | % Reduction | |
|---|---|---|---|---|---|---|---|---|---|---|---|
| 1 | 25.4 | 0   | —    | —   | —   | —    | —   | 720  | 600  | 17 | a |
| 2 | 20.9 | 2.3 | 2.1  | 1.8 | 9.0 | 86.0 | 1.2 | 870  | 330  | 62 |   |
| 3 | 25.5 | 57  | 3.8  | 3.1 | 7.4 | 84.6 | 1.1 | 520  | 370  | 29 | b |
| 4 | 21.8 | 2.0 | 32.8 | 2.7 | 5.0 | 58.7 | 0.9 | 1550 | 1000 | 35 | c |
| 5 | 20.4 | 1.5 | 57.9 | 3.3 | 3.2 | 35.1 | 0.6 | 1177 | 710  | 40 |   |

TABLE II-continued

Summary of Data in Example 2

| Week | Feed Rate, ml/hr. | Gas Evolved, ml/hr. | Gas Composition (mole-%) | | | | | COD | | | Remarks |
|---|---|---|---|---|---|---|---|---|---|---|---|
| | | | CH$_4$ | CO$_2$ | O$_2$ | N$_2$ | A | In | Out | % Reduction | |
| 6 | 21.0 | 2.0 | 43.4 | 3.2 | 2.5 | 50.2 | 0.7 | — | — | — | |

[a]Data for one day only.
[b]Gas leak occured; attempted to seal gas leak with tape.
[c]Attempted to seal gas leak with tape.

EXAMPLE 3

The procedure of Example 1 was repeated with some changes in equipment. The hydrolytic redox bioreactor consisted of a Lab-Crest column, without jacket, 400×15 mm. The bioreactor was charged with 50 g. of CGZ carrier. The anaerobic bioreactor consisted of an outer jacket 31.1 cm. in length and a fritted glass membrane 30.5 cm. in length and 1.6 cm. in diameter. The membrame, which was fused to the outer jacket, consisted of three sections of fritted glass tubing of equal length which had been fused together. The total length of the anaerobic reactor was 40.6 cm. The membrane had a pore diameter distribution of 3–6μ and an average pore diameter of 4.5μ. The membrane was made hydrophobic by allowing it to react with 130 ml. of ten percent octadecyltrichlorosilane in acetone at ambient temperature for about three days. The membrane then was removed from the acetone solution and washed successively with two 130-ml. portions of acetone, two 130-ml. portions of methanol, and a 130-ml. portion of acetone. The membrane was air-dried by aspiration. The anaerobic bioreactor was charged with 23 g. of CGZ carrier. The gas pump was a Cole-Parmer Masterflex peristaltic pump.

The results are summarized in Table III. The membrane, however, passed liquid water during the time the process was in operation, demonstrating that the pore diameters of the fritted glass membrane in general were too large.

*Chlamydomonas Sp., Ankistrodesmus Sp., Chondrus Sp., Corallina Sp., Callilhamnion Sp.,* and the like.

Figure 2:
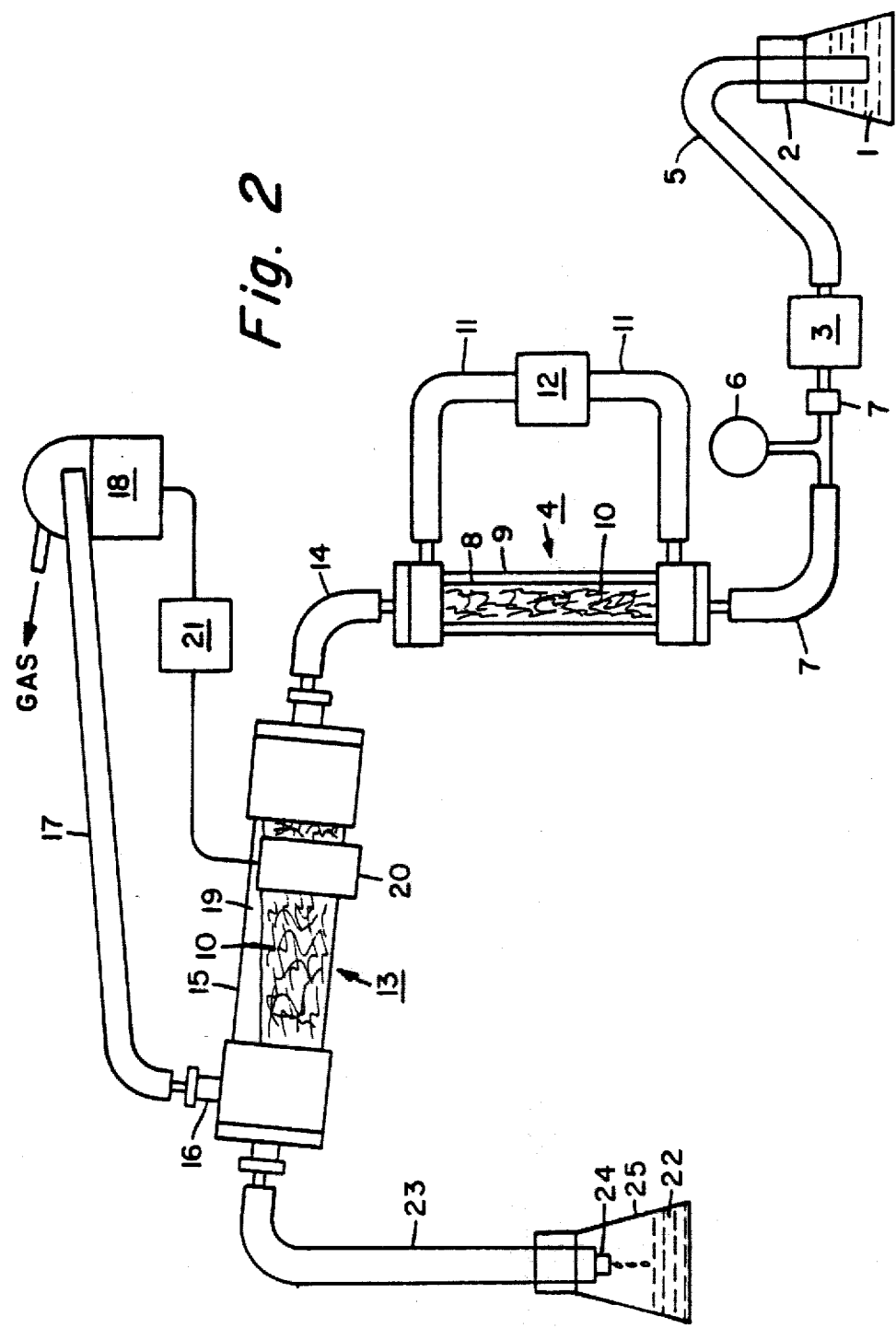

The process employed in Examples 4–7 is described below, with reference to FIG. 2.

Sewage (or other waste) 1 is pumped from container 2 by pump 3 via rubber tubing 5 sealably connected to the pump. The discharge from the pump is led to hydrolytic redox bioreactor 4 via rubber tubing 7 having inserted therein pressure gauge 6, the rubber tubing being sealably connected to the pump, gauge, and bioreactor. The hydrolytic redox bioreactor consists of inner glass tube 8 sealably enclosed within glass jacket 9. The inner glass tube contains inorganic carrier 10 such as that described in U.S. Pat. No. 4,153,510, which is suitable for the accumulation of a biomass. The glass jacket is sealably connected via rubber tubing 11 to constant-temperature water-bath 12. Sewage (or other waste) leaving the hydrolytic redox bioreactor is transported to anaerobic bioreactor 13 via rubber tubing 14 sealably connected to both bioreactors. The anaerobic bioreactor consists of glass jacket 15 having exit port 16. The glass jacket is partially filled with additional inorganic carrier 10 and is sealably closed at each end. Rubber tubing 17, sealably connected to the exit port of the jacket, leads to pump 18 which removes gas (methane) from air space 19 enclosed by the jacket. Such gas in turn is collected by any suitable means such as by the displacement of water in an inverted vessel (not shown). The glass jacket of the anaerobic bioreactor is fitted with liquid level sensing means 20 which is connected

TABLE III

Summary of Data Obtained in Example 3

| Week | Feed Rate, ml/hr. | Gas Evolved, ml/hr. | Gas Composition (mole-%) | | | | | COD | | | Remarks |
|---|---|---|---|---|---|---|---|---|---|---|---|
| | | | CH$_4$ | CO$_2$ | O$_2$ | N$_2$ | A | In | Out | % Reduction | |
| 1 | 28.8 | 25.8 | — | — | — | — | — | — | — | — | a |
| 2 | 20.4 | 0.5 | 0.4 | 2.2 | 0.1 | 94.9 | 2.4 | — | — | — | b |
| 3 | 34.9 | 0.6 | 10.4 | 4.3 | 0 | 83.3 | 2.0 | — | — | — | c |
| 4 | 30.2 | 0.5 | 21.4 | 1.6 | 0.5 | 74.7 | 1.8 | — | — | — | |
| 5 | 29.4 | 0.6 | 31.1 | 1.8 | 0 | 65.6 | 1.6 | 270 | 190 | 30 | |
| 6 | 31.0 | 0.7 | 38.4 | 3.1 | 0.4 | 56.7 | 1.4 | 325 | 225 | 31 | |
| 7 | 31.8 | 0.8 | 45.8 | 4.1 | 0.1 | 48.9 | 1.2 | — | — | — | |
| 8 | 32.4 | 1.2 | 53.2 | 5.2 | 0 | 40.5 | 1.0 | 350 | 198 | 43 | |
| 9 | 34.0 | 1.6 | 66.9 | 7.6 | 0.3 | 24.6 | 0.7 | 650 | 328 | 50 | |
| 10 | 34.0 | 1.6 | 67.4 | 8.0 | 0.3 | 23.7 | 0.7 | 765 | 342 | 55 | |
| 11 | 33.9 | 0.9 | 69.2 | 5.3 | 0.4 | 24.4 | 0.7 | 445 | 220 | 51 | |
| 12 | 35.0 | 0.3 | 72.5 | 4.7 | 0.2 | 22.0 | 0.6 | — | — | — | |

[a]Leak in anaerobic bioreactor; attempted to seal the leak with appropriate clamps.
[b]Adjusted anaerobic bioreactor to a horizontal position and made certain that reactor was irradiated by sunlight and over-head lights.
[c]A red microbial growth was observed on the exterior surface of the membrane.

Example 3 also illustrates a preferred embodiment of the process of the present invention, which embodiment comprises establishing an additional microbe colony on the gas-space side of the inorganic membrane of the anaerobic bioreactor. Most preferably, such microbes will be photosynthetic microbes, examples of which include, among others *Rhodospirillum rubrum, Chromatium Sp., Chlorobium thiosulfatophilum, Chloropseudomonas ethylica, Chorella Sp., Scenedesmus Sp.,* electrically to liquid level controller 21. The controller in turn is electrically connected to pump 18. Sewage effluent 22 then is transported, via rubber tubing 23 sealably connected to the anaerobic bioreactor and fitted with check valve 24, to receiving vessel 25.

EXAMPLE 4

The procedure of Example 1 was repeated, except for the following modifications. The hydrolytic redox bioreactor was charged with 24.5 g. of cordierite carrier having an average pore diameter of 3μ and a pore diameter disstribution of 2-9μ. The anaerobic bioreactor was a 250×15 mm. Lab-Crest jacketed column having about 125 mm. of the inner column or cylinder removed. Thus, the jacket became the bioreactor, with the end pieces of the inner column serving only to seal the ends of the bioreactor. The anaerobic bioreactor then was charged with 51 g. of the cordierite carrier and the bioreactor was mounted in a substantially horizontal position. A pressure gauge was inserted in the tubing connecting pump 3 to the inlet of the hydrolytic redox bioreactor. The water jacket of the hydrolytic redox bioreactor was connected to a constant-temperature water-bath. The total fluid volume of the pump, tubing, and bioreactors was 120 ml.

The apparatus was seeded as follows: The tubing leading from the pressure gauge was disconnected from the inlet of the hydrolytic redox bioreactor. To such inlet then was attached the tubing leading from the anaerobic bioreactor of the operational apparatus of Example 1. Using sewage as feed, the two apparatuses were maintained in the coupled configuration and operated essentially as described in Example 1 for 13 days. During this period, apparatus performance was monitored as summarized in Table IV.

TABLE IV

Summary of Data Obtained During Seeding of Apparatus in Example 4

| Day | Feed Rate, ml/hr. | Gas Evolved, ml/hr. | $CH_4$ | $CO_2$ | $O_2$ | $N_2$ | A |
|---|---|---|---|---|---|---|---|
| 1 | 31 | 2.3 | — | — | — | — | — |
| 2 | 37.1 | 5.7 | 91.1 | 3.2 | 0.3 | 5.2 | 0.1 |
| 5 | 32.8 | 6.8 | 66.0 | 4.0 | 1.3 | 28.3 | 0.5 |
| 6 | 37.2 | 1.2 | 70.3 | 2.5 | 1.6 | 24.8 | 0.4 |
| 7 | 47.3 | 3.4 | 90.6 | 2.4 | 0.4 | 6.5 | 0.2 |
| 8 | 36.9 | 3.4 | 88.1 | 2.2 | 0.4 | 9.1 | 0.2 |
| 9 | 32.2 | 4.2 | 84.2 | 2.7 | 0.1 | 12.7 | 0.3 |
| 13 | 35.9 | 2.0 | 78.4 | 0.8 | 0.3 | 20.0 | 0.4 |

The apparatus then was disconnected from the operational apparatus of Example 1 and the tubing leading from the pressure gauge was re-attached to the inlet of the hydrolytic redox bioreactor. The apparatus then was operated independently, using sewage adjusted to a pH of 8.6-8.9 (with aqueous sodium hydroxide) as feed. The data thus obtained are summarized in Tables V and VI. Table V summarizes the operating parameters and gas composition, and Table VI summarizes apparatus performance and carbon balance calculations.

TABLE V

Summary of Operating Parameters and Gas Composition in Example 4

| Day | Feed Rate, ml/hr | Gas Evolved, ml/hr | Pressure, psi | Influent pH | Effluent pH | $CH_4$ | $CO_2$ | $O_2$ | $N_2$ | A | Remarks |
|---|---|---|---|---|---|---|---|---|---|---|---|
| 14 | 37.7 | 2.9 | — | 8.6 | 8.5 | 81.2 | 1.6 | 0.1 | 16.7 | 0.4 | |
| 15 | 41.4 | 0.1 | — | 8.0 | 8.0 | 42.3 | 2.5 | 2.2 | 52.1 | 0.9 | a |
| 16 | 37.3 | — | — | 8.4 | 8.1 | — | — | — | — | — | b |
| 19 | 16.3 | 0.4 | — | 8.0 | 8.2 | 61.9 | 1.6 | 0 | 35.8 | 0.7 | |
| 20 | 41.4 | 0 | 0 | 8.6 | 8.1 | — | — | — | — | — | |
| 22 | 20.3 | 0.6 | 0 | 8.1 | 8.1 | 64.1 | 1.3 | 0.1 | 33.9 | 0.6 | c |
| 23 | 9.9 | 0 | 2 | 8.0 | 8.4 | — | — | — | — | — | |
| 26 | 9.8 | 1.1 | 1.4 | 8.2 | 8.6 | 69.5 | 1.1 | 0.6 | 28.3 | 0.5 | |
| 27 | 25.0 | 0.4 | 1.0 | — | — | 75.6 | 1.4 | 0.8 | 21.9 | 0.4 | |
| 28 | 22.6 | 0.6 | 1.2 | — | — | 74.8 | 1.0 | 0 | 23.7 | 0.5 | |
| 29 | 20.3 | 1.1 | 1.5 | 8.4 | 8.2 | 81.8 | 1.9 | 0.1 | 15.9 | 0.3 | |
| 30 | 28.2 | 3.9 | 1.2 | 8.5 | 8.1 | 83.6 | 1.6 | 0.1 | 14.5 | 0.3 | |
| 33 | 31.2 | 1.6 | 1.2 | 8.1 | 8.0 | 82.0 | 1.8 | 0.1 | 15.8 | 0.4 | |
| 34 | 16.0 | 2.5 | 1.0 | 8.5 | 8.1 | 82.5 | 3.4 | 0 | 13.6 | 0.2 | |
| 35 | 4.0 | 4.9 | 1.4 | 8.6 | 8.6 | 91.1 | 4.3 | 0 | 4.6 | 0.1 | |
| 36 | 19.0 | 6.5 | 1.2 | 8.6 | 8.3 | 93.8 | 3.9 | 0 | 2.2 | 0.1 | |
| 37 | 10.0 | 8.3 | 1.1 | 8.6 | 8.5 | 94.1 | 3.7 | 0 | 2.1 | 0.1 | |
| 40 | 13.9 | 2.5 | 1.7 | 8.4 | 8.4 | 92.4 | 4.6 | 0 | 2.8 | 0.1 | |
| 41 | 18.6 | 6.9 | 1.9 | 8.5 | 8.1 | 93.2 | 3.8 | 0.1 | 2.8 | 0.1 | |
| 42 | 28.4 | 5.5 | 1.6 | 8.6 | 8.2 | 93.9 | 2.7 | 0 | 3.3 | 0.1 | |
| 43 | 30.5 | 17.9 | 1.5 | 8.3 | 8.0 | 83.5 | 3.7 | 1.7 | 10.9 | 0.2 | |
| 44 | 28.3 | 10.1 | 1.4 | 8.6 | 8.1 | 93.6 | 3.9 | 0 | 2.3 | 0.1 | |
| 47 | 7.8 | 2.2 | 2.0 | 8.0 | 8.6 | 87.7 | 6.2 | 0 | 6.1 | 0.1 | |
| 48 | 22.2 | 4.5 | 1.0 | 8.0 | 8.0 | 88.7 | 4.8 | 0 | 6.4 | 0.1 | |
| 49 | 22.8 | 9.1 | 1.5 | 8.5 | 8.0 | 92.7 | 4.3 | 0.1 | 2.8 | 0.1 | |
| 50 | 21.8 | 15.5 | 1.6 | 8.4 | 8.0 | 92.8 | 5.5 | 0 | 5.6 | 0.1 | |
| 51 | 10.1 | 2.9 | 1.2 | 8.6 | 8.3 | 88.3 | 5.9 | 0.1 | 5.6 | 0.1 | |
| 54 | — | — | — | — | — | — | — | — | — | — | e |
| 55 | 4.1 | 3.2 | 1.0 | 8.4 | 8.2 | 91.8 | 4.8 | 0 | 3.3 | 0.1 | |
| 56 | 22.5 | 5.2 | 1.9 | 8.6 | 8.3 | 93.3 | 4.8 | 0.1 | 1.8 | 0.1 | |
| 57 | 35.9 | 16.2 | 1.6 | 8.4 | 8.2 | 93.1 | 4.2 | 0 | 2.6 | 0.1 | |
| 58 | 36.8 | 22.6 | 1.5 | 8.2 | 8.1 | 92.8 | 3.8 | 0 | 3.3 | 0.1 | |
| 62 | 48.0 | 13.5 | 2.4 | 8.4 | 8.2 | 92.4 | 2.5 | 0.1 | 4.9 | 0.1 | f |
| 104 | — | — | — | — | — | — | — | — | — | — | g |
| 106 | 31.9 | 12.6 | 1.0 | 8.5 | 8.3 | 94.0 | 2.7 | 0 | 3.1 | 0.1 | |
| 107 | 27.2 | 12.4 | 1.0 | 8.6 | 8.2 | 95.2 | 2.4 | 0 | 2.4 | 0.1 | h |
| 110 | 26.4 | 4.1 | 1.0 | 8.1 | 8.1 | 92.2 | 3.1 | 0.3 | 4.2 | 0.1 | |

TABLE V-continued

Summary of Operating Parameters and Gas Composition in Example 4

| Day | Feed Rate, ml/hr | Gas Evolved, ml/hr | Pressure, psi | Aqueous Medium pH Influent | Effluent | Gas Composition (mole %) CH$_4$ | CO$_2$ | O$_2$ | N$_2$ | A | Remarks |
|---|---|---|---|---|---|---|---|---|---|---|---|
| 111 | 28.3 | 12.6 | 1.0 | 8.5 | 8.0 | 92.0 | 2.8 | 0.2 | 4.5 | 0.2 | |

[a]Gas pump was removed, thereby relying on anaerobic bioreactor pressure to transfer gas.
[b]The temperature of the water-bath was increased from ambient temperature to 30°, and a one psi check valve was inserted in the end of the tubing leading from the anaerobic bioreactor.
[c]The one psi check valve was replaced with a three psi check valve.
[d]Check valve cleaned after becoming plugged.
[e]Because of difficulties encountered in matching gas removal rates to feed rates, a Lab Monitor III liquid level control was attached to the anaerobic bioreactor to maintain the liquid level at about 60% pull. The switching function of the controller was connected to the feed pump.
[f]The apparatus was shut down and held at ambient temperature for 42 days.
[g]Operation was resumed; water-bath temperature was adjusted to 31°. The switching function of the liquid level controller was removed from the feed pump and connected to the gas pump. The three psi check valve was replaced with a one psi check valve.
[h]Increased water-bath temperature to 40°.

TABLE VI

Summary of Apparatus Performance and Carbon Balance Calculations in Example 4

| | COD (mg/l) | | | Carbon (mg/l) | | | CH$_4$ Produced as % of: | |
|---|---|---|---|---|---|---|---|---|
| Day | Influent | Effluent | % Reduction | Influent | Effluent | % Reduction | C Delivered | C Volatilized |
| 15 | — | — | — | 450 | 412 | 8.4 | | |
| 20 | 1200 | 990 | 17.5 | 403 | 334 | 17.1 | | |
| 27 | 480 | 360 | 25.0 | 287 | 250 | 12.9 | | |
| 29 | 1100 | 600 | 45.5 | 373 | 336 | 9.9 | | |
| 34 | 3500 | 1500 | 57.1 | 1398 | 709 | 49.3 | | |
| 36 | 2700 | 1500 | 44.4 | 969 | 662 | 31.7 | | |
| 41 | 2000 | 410 | 79.5 | 712 | 311 | 56.3 | | |
| 43 | 1800 | 660 | 63.3 | 658 | 391 | 40.6 | 39.8 | 98.1 |
| 48 | 790 | 410 | 48.1 | 448 | 330 | 26.3 | | |
| 50 | 1600 | 310 | 80.6 | 651 | 348 | 46.5 | 54.3 | 116 |
| 55 | 2100 | 250 | 88.1 | 745 | 305 | 59.1 | | |
| 57 | 1600 | 330 | 79.4 | 576 | 303 | 47.4 | 39.1 | 82.4 |
| 62 | 900 | 270 | 70.0 | 371 | 245 | 34.0 | 37.5 | 110.5 |
| 106 | 1850 | 730 | 60.5 | 680 | 454 | 33.2 | 29.3 | 88.0 |
| 111 | 1510 | 380 | 74.8 | 571 | 303 | 46.9 | 38.4 | 81.9 |

EXAMPLE 5

The procedure of Example 4 was repeated, except that the carrier employed was Duralite Rouge (F. Guery, Rambervillers, France) having a pore diameter distribution of 0.4–6μ, an average pore diameter of 4.5μ, a pore volume of 0.4 cc./g., and a porosity of 51.5%; the amounts of carrier employed in the hydrolytic redox bioreactor and the anaerobic bioreactor were 22 g. and 52.5 g., respectively.

The apparatus was seeded as described in Example 4, except that the water-bath temperature was adjusted to 31° and operation in a coupled configuration was maintained for about six days. Additionally, a one psi check valve was inserted in the end of the effluent tubing leading from the anaerobic bioreactor. Although the performance of the apparatus was monitored over the next 33 days, satisfactory performance was not observed until the fortieth day of operation (including the six days of operation in the coupled configuration). On the twentieth day of operation, the one psi check valve was replaced with a three psi check valve. Table VII summarizes the operating parameters and gas composition from the fortieth day of operation and Table VIII similarly summarizes apparatus performance and carbon balance calculations.

TABLE VII

Summary of Operating Parameters and Gas Composition in Example 5

| Day | Feed Rate, ml/hr | Gas Evolved, ml/hr | Pressure, psi | Aqueous Medium pH Influent | Effluent | Gas Composition (mole-%) CH$_4$ | CO$_2$ | O$_2$ | N$_2$ | A | Remarks |
|---|---|---|---|---|---|---|---|---|---|---|---|
| 40 | 19.3 | 2.5 | 2.0 | 8.5 | 8.1 | 80.0 | 2.5 | 3.4 | 13.7 | 0.3 | |
| 41 | 14.3 | 3.7 | 2.0 | 8.7 | 8.2 | 90.8 | 1.7 | 0 | 7.4 | 0.2 | |
| 42 | 31.9 | 6.8 | 2.0 | 8.6 | 8.1 | 89.4 | 1.5 | 0 | 8.9 | 0.2 | |
| 43 | 25.4 | 6.6 | 2.0 | 8.6 | 8.1 | 93.6 | 2.0 | 0 | 4.3 | 0.1 | |
| 46 | 25.5 | 7.8 | 2.2 | 8.2 | 8.2 | 90.2 | 3.1 | 0 | 6.4 | 0.2 | |
| 47 | 27.0 | 10.1 | 2.1 | 8.7 | 8.0 | 92.7 | 3.1 | 0.1 | 4.0 | 0.1 | |
| 48 | 26.3 | 8.4 | 2.1 | 8.4 | 8.0 | 91.9 | 3.2 | 0 | 4.9 | 0.1 | |
| 49 | 26.9 | 5.0 | 2.0 | 8.4 | 7.9 | 88.9 | 2.0 | 0.2 | 8.8 | 0.1 | a |
| 50 | 25.9 | 9.4 | 2.8 | 7.0 | 7.3 | 87.6 | 8.2 | 0.1 | 4.1 | 0.1 | |
| 53 | 22.7 | 5.9 | 2.4 | 7.6 | 8.0 | 86.5 | 5.9 | 0 | 7.4 | 0.1 | |
| 54 | 24.5 | 7.5 | 2.5 | 6.8 | 7.6 | 85.3 | 9.7 | 0 | 4.8 | 0.1 | |
| 55 | 23.8 | 7.7 | 2.2 | 7.0 | 7.7 | 85.1 | 9.9 | 0 | 7.0 | 0.1 | |
| 56 | 24.3 | 6.4 | 2.1 | 7.3 | 7.6 | 83.4 | 9.4 | 0 | 7.0 | 0.1 | |
| 57 | 25.2 | 15.7 | 2.0 | 7.2 | 7.7 | 86.4 | 11.0 | 0 | 2.6 | 0.1 | |
| 60 | 21.1 | 18.0 | 2.2 | 7.7 | 7.9 | 88.4 | 8.1 | 0 | 3.5 | 0.1 | |
| 61 | 24.1 | 21.5 | 2.0 | 9.2 | 7.9 | 92.0 | 5.3 | 0.1 | 2.5 | 0.1 | |
| 62 | 25.9 | 23.3 | 2.0 | 9.8 | 7.9 | 92.0 | 6.0 | 0 | 1.9 | 0.1 | |

TABLE VII-continued

Summary of Operating Parameters and Gas Composition in Example 5

| Day | Feed Rate, ml/hr | Gas Evolved, ml/hr | Pressure, psi | Aqueous Medium pH Influent | Aqueous Medium pH Effluent | $CH_4$ | $CO_2$ | $O_2$ | $N_2$ | A | Remarks |
|---|---|---|---|---|---|---|---|---|---|---|---|
| 63 | 23.6 | 22.6 | 2.0 | 8.6 | 7.7 | 93.5 | 6.1 | 0 | 0.3 | 0 | b |
| 64 | 26.2 | 17.2 | 2.0 | 10.0 | 7.7 | 83.1 | 14.9 | 0 | 2.0 | 0 | c |
| 67 | 23.2 | 19.4 | 2.5 | 7.2 | 7.7 | 88.3 | 11.7 | 0 | 0 | 0 | c |
| 68 | 20.7 | 21.3 | 2.5 | 9.5 | 7.8 | 81.0 | 17.7 | 0 | 1.0 | 0 | d | a Feed changed from sewage to sewage containing 1% by volume spent sulfite liquor; pH of the feed was adjusted to 9.0-9.9 with aqueous sodium hydroxide. Contributuions of the spent sulfite liquor toward COD and total carbon are about 2280 mg./l. and about 760 mg./l., respectively.
b Spent sulfite liquor content in the sewage increased to 2.5% by volume; pH adjusted to 9.7. Contributions of the liquor to COD and total carbon are about 5700 mg./l and 1900 mg./l., respectively.
c 0.2% $H_2S$ present in evolved gas.
d 0.3% $H_2S$ present in evolved gas.

TABLE VIII

Summary of Apparatus Performance and Carbon Balance Calculations in Example 5

| | COD (mg/l) | | | Carbon (mg/l) | | | $CH_4$ Produced as % of: | |
|---|---|---|---|---|---|---|---|---|
| Day | Influent | Effluent | % Reduction | Influent | Effluent | % Reduction | C Delivered | C Volatilized |
| 40 | 920 | 290 | 68.5 | 365 | 213 | 41.6 | | |
| 42 | 1800 | 1000 | 44.4 | 706 | 391 | 44.6 | | |
| 47 | 1400 | 430 | 69.3 | 578 | 322 | 44.3 | 32.1 | 72.6 |
| 49 | 780 | 220 | 71.8 | 284 | 162 | 43.0 | 31.0 | 72.1 |
| 54 | 2400 | 1500 | 37.5 | 889 | 644 | 27.6 | 15.7 | 57.1 |
| 56 | 2300 | 1500 | 34.8 | 834 | 638 | 23.5 | 14.1 | 60.0 |
| 61 | 6000 | 3400 | 43.3 | 2064 | 1493 | 27.7 | 21.3 | 77.0 |
| 63 | 6300 | 3600 | 42.9 | 1948 | 1275 | 34.5 | 24.6 | 71.3 |
| 68 | 8500 | 5000 | 41.2 | 2616 | 1911 | 26.9 | 17.1 | 63.3 |

EXAMPLE 6

The procedure of Example 4 was repeated, except that the carrier used was Duralite Noire (F. Guery, Rambervillers, France) having a pore diameter distribution of 0.8-30$\mu$, an average pore diameter of 6$\mu$, and a porosity of 34.1%; the amounts of carrier charged to the hydrolytic redox and anaerobic bioreactors were 20 g. and 50 g., respectively. The apparatus was set up and seeded for ten days as described in Example 5. Appreciable reductions in COD were not observed until the 34th day of operation; consequently, the tabular summaries begin with the 34th day. Table IX summarizes operating parameters and gas composition and Table X summarizes apparatus performance and carbon balance calculations.

TABLE IX

Summary of Operating Parameters and Gas Composition in Example 6

| Day | Feed Rate, ml/hr | Gas Evolved, ml/hr | Pressure, psi | Aqueous Medium pH Influent | Aqueous Medium pH Effluent | $CH_4$ | $CO_2$ | $O_2$ | $N_2$ | A | Remarks |
|---|---|---|---|---|---|---|---|---|---|---|---|
| 34 | 11.4 | 4.8 | 0.7 | 8.7 | 7.9 | 90.5 | 3.8 | 0 | 5.6 | 0.1 | |
| 35 | 25.8 | 5.0 | 0.7 | 8.5 | 7.9 | 90.1 | 2.2 | 0.4 | 7.1 | 0.2 | |
| 39 | 25.8 | 8.7 | 0.6 | 8.7 | 8.1 | 92.7 | 1.5 | 0.4 | 5.2 | 0.1 | |
| 40 | 32.0 | 10.0 | 0.6 | 8.9 | 8.2 | 93.1 | 1.0 | 0.3 | 5.5 | 0.1 | |
| 41 | 35.9 | 10.9 | 0.7 | 8.8 | 8.0 | 93.1 | 1.6 | 0 | 5.2 | 0.1 | |
| 48 | 24.5 | 7.1 | 0.5 | 8.5 | 8.0 | 93.7 | 0.7 | 0.2 | 5.3 | 0.1 | |
| 49 | 19.4 | 8.2 | 0.5 | 8.4 | 7.9 | 91.3 | 3.4 | 0.4 | 4.8 | 0.1 | |
| 52 | 15.9 | 7.3 | 0.5 | 7.5 | 8.1 | 90.1 | 3.6 | 0.7 | 5.5 | 0 | |
| 53 | 22.6 | 10.9 | 0.5 | 8.6 | 7.9 | 91.3 | 2.8 | 0.8 | 4.9 | 0.1 | |
| 54 | 21.2 | 11.2 | 0.6 | 8.7 | 7.9 | 94.1 | 2.5 | 0.1 | 3.1 | 0.1 | |
| 55 | 16.2 | 8.6 | 0.7 | 8.6 | 8.1 | 91.8 | 2.3 | 1.1 | 4.7 | 0.1 | |
| 59 | 17.2 | 8.6 | 0.5 | 8.1 | 8.2 | 90.3 | 3.3 | 0.9 | 5.3 | 0.1 | |
| 60 | 18.2 | 11.0 | 0.5 | 8.8 | 8.0 | 92.7 | 3.1 | 0.5 | 3.6 | 0.1 | |
| 61 | 22.2 | 13.0 | 0.5 | 8.7 | 8.0 | 93.9 | 3.4 | 0.1 | 2.6 | 0.1 | |
| 62 | 17.6 | 11.9 | 0.5 | 8.7 | 8.1 | 92.5 | 3.2 | 0.6 | 3.7 | 0.1 | |
| 67 | 25.9 | 10.3 | 0.5 | 8.6 | 7.9 | 90.1 | 2.4 | 0.7 | 6.8 | 0.1 | |
| 69 | 23.1 | 8.1 | 0.5 | 8.5 | 8.1 | 91.7 | 2.2 | 0.7 | 5.3 | 0.1 | |
| 70 | 25.9 | 9.9 | 0.5 | 8.5 | 7.8 | 90.4 | 2.6 | 0.4 | 6.4 | 0.1 | |
| 74 | 19.3 | 13.4 | 0.7 | 7.9 | 8.4 | 91.7 | 5.1 | 0.1 | 3.0 | 0 | |
| 75 | 19.3 | 17.0 | 0.5 | 8.8 | 8.0 | 93.4 | 4.1 | 0.3 | 2.2 | 0 | |
| 76 | 21.4 | 16.9 | 0.5 | 8.7 | 8.0 | 93.2 | 3.7 | 0.5 | 2.7 | 0 | |
| 77 | 18.6 | 18.9 | 0.5 | 8.6 | 7.8 | 98.3 | 4.5 | 0.1 | 2.0 | 0 | |
| 80 | 7.0 | 7.0 | 0.8 | 8.2 | 8.2 | 91.2 | 5.0 | 0.8 | 3.0 | 0 | |
| 81 | 26.9 | 21.5 | 0.5 | 8.6 | 7.8 93.7 | 3.8 | 0.2 | 2.4 | 0 | | |
| 82 | 29.1 | 23.6 | 0.5 | 8.6 | 7.7 | 93.8 | 4.3 | 0.1 | 1.8 | 0 | |
| 83 | 28.8 | 24.0 | 0.5 | 8.7 | 7.9 | 93.7 | 4.5 | 0.1 | 1.7 | 0 | |
| 87 | 17.7 | 17.5 | 0.9 | 8.4 | 8.1 | 93.1 | 5.4 | 0.1 | 1.5 | 0 | |
| 88 | 27.1 | 19.0 | 0.5 | 8.5 | 7.7 | 93.9 | 4.1 | 0 | 2.0 | 0 | |

TABLE X

Summary of Apparatus Performance and Carbon Balance Calculations in Example 6

| Day | COD (mg/l) Influent | COD (mg/l) Effluent | % Reduction | Carbon (mg/l) Influent | Carbon (mg/l) Effluent | % Reduction | CH$_4$ Produced as % of: C Delivered | CH$_4$ Produced as % of: C Volatilized |
|---|---|---|---|---|---|---|---|---|
| 34 | 3500 | 2700 | 22.9 | 1135 | 974 | 14.2 | | |
| 39 | 2400 | 1400 | 41.7 | 908 | 646 | 28.9 | | |
| 41 | 2300 | 1500 | 34.8 | 812 | 628 | 22.7 | | |
| 48 | 1700 | 830 | 51.2 | 589 | 393 | 33.3 | 24.6 | 73.9 |
| 53 | 1500 | 390 | 74.0 | | | | | |
| 55 | 1300 | 210 | 83.8 | | | | | |
| 60 | 1750 | 230 | 86.9 | 669 | 309 | 53.8 | 44.9 | 83.4 |
| 62 | 905$^a$ | 25$^a$ | 97.2 | 657 | 305 | 53.6 | 51.1 | 95.4 |
| 67 | 1120 | 140 | 87.5 | 417 | 235 | 43.6 | 45.9 | 105.0 |
| 69 | 810 | 110 | 86.4 | 377 | 217 | 42.4 | 45.9 | 108.0 |
| 74 | 1600 | 330 | 79.4 | 630 | 336 | 46.7 | 54.3 | 116.0 |
| 76 | 1700 | 320 | 81.2 | 801 | 355 | 55.7 | 49.2 | 88.4 |
| 81 | 2600 | 580 | 77.7 | 952 | 509 | 46.5 | 42.1 | 90.6 |
| 83 | 2300 | 630 | 72.6 | 940 | 478 | 49.1 | 44.1 | 90.5 |
| 88 | 2100 | 290 | 86.2 | | | | | |

$^a$BOD value (mg/l)

EXAMPLE 7

The procedure of Example 4 was repeated, except that the carrier employed was Johns-Manville Insulating Firebrick JM-23 (Johns-Manville Corp., Denver, Colo.) having a pore diameter distribution of 2-15μ, an average pore diameter of 9μ, a pore volume of 1.0 cc./g., and a porosity of 68%. The amounts of carrier employed in the hydrolytic redox and anaerobic bioreactors were ten g. and 15 g., respectively. Again, the apparatus was set up and seeded for seven days as described in Example 5. Although satisfactory performance was observed on the 29th day, periodic leaks were a problem until the 37th day of operation. Beginning with the 29th day, Tables XI and XII summarize operating parameters and gas composition, and apparatus performance and carbon balance calculations, respectively.

TABLE XI

Summary of Operating Parameters and Gas Composition in Example 7

| Day | Feed Rate, ml/hr | Gas Evolved, ml/hr | Pressure, psi | Aqueous Medium pH Influent | Aqueous Medium pH Effluent | Gas Composition (mole-%) CH$_4$ | CO$_2$ | O$_2$ | N$_2$ | A | Remarks |
|---|---|---|---|---|---|---|---|---|---|---|---|
| 29 | 29.0 | 5.0 | 1.4 | 8.9 | 8.3 | 90.8 | 0.4 | 0.2 | 8.4 | 0.2 | |
| 30 | 26.9 | 5.9 | 1.6 | 8.8 | 8.1 | 93.2 | 0.7 | 0 | 6.0 | 0.1 | |
| 35 | 34.3 | 0.8 | 1.3 | 8.6 | 8.1 | 18.8 | 1.2 | 18.4 | 60.6 | 1.0 | |
| 36 | 21.6 | 1.4 | 1.4 | 8.5 | 8.1 | 58.9 | 0.9 | 1.0 | 38.6 | 0.6 | |
| 37 | 21.5 | 5.2 | 1.3 | 8.5 | 8.0 | 90.3 | 1.6 | 0.3 | 7.6 | 0.2 | |
| 38 | 20.9 | 6.7 | 1.4 | 8.5 | 7.9 | 82.0 | 1.9 | 0.3 | 15.7 | 0.1 | |
| 41 | 19.8 | 7.4 | 1.6 | 7.8 | 8.1 | 92.1 | 3.4 | 0.2 | 4.3 | 0.1 | |
| 42 | 20.9 | 8.8 | 1.5 | 8.6 | 7.8 | 92.5 | 2.7 | 0.2 | 4.6 | 0.1 | |
| 43 | 21.0 | 8.8 | 1.4 | 8.7 | 7.9 | 94.2 | 2.1 | 0.1 | 3.5 | 0.1 | |
| 44 | 20.8 | 8.4 | 1.4 | 8.7 | 8.1 | 93.7 | 2.3 | 0.1 | 3.8 | 0.1 | |
| 45 | 20.0 | 7.9 | 1.5 | 8.8 | 8.0 | 85.5 | 1.9 | 2.2 | 10.3 | 0.2 | |
| 48 | 15.6 | 7.5 | 1.6 | 8.1 | 8.2 | 90.8 | 3.5 | 0.3 | 5.4 | 0.1 | |
| 49 | 16.5 | 9.7 | 1.7 | 8.8 | 8.0 | 94.6 | 3.5 | 0 | 2.0 | 0 | |
| 51 | 27.0 | 13.5 | 1.2 | 8.7 | 8.0 | 94.7 | 2.4 | 0 | 2.9 | 0 | $a$ |
| 56 | 21.7 | 5.9 | 1.5 | 8.7 | 7.9 | 90.7 | 2.0 | 0.1 | 7.1 | 0.1 | |
| 58 | 18.7 | 5.5 | 1.4 | 8.5 | 8.2 | 88.5 | 2.0 | 1.1 | 8.2 | 0.1 | |
| 59 | 18.7 | 5.1 | 1.4 | 8.5 | 7.9 | 89.2 | 2.6 | 0.4 | 7.7 | 0.2 | |
| 65 | 22.9 | 13.20 | 1.3 | 8.8 | 8.0 | 94.0 | 3.0 | 0.1 | 2.9 | 0 | |
| 66 | 18.6 | 12.8 | 1.4 | 8.6 | 8.0 | 92.7 | 4.0 | 0.1 | 3.1 | 0 | |
| 69 | 27.4 | 14.1 | 1.9 | 8.1 | 7.7 | 92.0 | 4.5 | 0.1 | 3.4 | 0 | |
| 70 | 27.8 | 16.4 | 1.9 | 8.6 | 7.8 | 95.4 | 2.9 | 0 | 1.7 | 0 | |
| 71 | 26.7 | 22.4 | 1.6 | 8.6 | 7.8 | 93.3 | 4.3 | 0.1 | 2.3 | 0 | |
| 72 | 22.8 | 20.7 | 1.6 | 8.6 | 7.9 | 93.9 | 4.8 | 0 | 1.3 | 0 | |
| 77 | 28.3 | 17.9 | 2.1 | 8.5 | 7.7 | 94.1 | 4.2 | 0 | 1.7 | 0 | |

$^a$Water-bath stopped functioning; operated hydrolytic redox bioreactor at ambient temperature (20°).
$^b$Water-bath repaired and placed in service; temperature adjusted to 31.5°.

TABLE XII

Summary of Apparatus Performance and Carbon Balance Calculations in Example 7

| Day | COD (mg/l) Influent | COD (mg/l) Effluent | % Reduction | Carbon (mg/l) Influent | Carbon (mg/l) Effluent | % Reduction | CH$_4$ Produced as % of: C Delivered | CH$_4$ Produced as % of: C Volatilized |
|---|---|---|---|---|---|---|---|---|
| 30 | 2400 | 1800 | 25.0 | 812 | 695 | 14.4 | | |
| 37 | 1700 | 930 | 45.3 | 588 | 387 | 34.2 | 19.8 | 57.9 |
| 42 | 1500 | 420 | 72.0 | | | | | |
| 44 | 1400 | 350 | 75.0 | | | | | |
| 49 | 1810 | 200 | 89.0 | 679 | 299 | 56.0 | 44.0 | 78.6 |
| 51 | 910$^a$ | 204$^a$ | 77.6 | 660 | 353 | 46.5 | 38.3 | 82.4 |

TABLE XII-continued

Summary of Apparatus Performance and Carbon Balance Calculations in Example 7

| Day | COD (mg/l) | | | Carbon (mg/l) | | | CH₄ Produced as % of: | |
|-----|---------|----------|------------|----------|----------|------------|-------------|--------------|
|     | Influent | Effluent | % Reduction | Influent | Effluent | % Reduction | C Delivered | C Volatilized |
| 56 | 1110 | 240 | 78.4 | 420 | 261 | 37.9 | 31.2 | 82.5 |
| 58 | 950 | 140 | 85.3 | 399 | 231 | 42.1 | 35.0 | 83.1 |
| 65 | 1800 | 660 | 63.3 | 794 | 457 | 42.4 | 36.6 | 86.1 |
| 70 | 2600 | 930 | 64.2 | 952 | 579 | 39.2 | 31.7 | 80.8 |
| 72 | 2400 | 490 | 79.6 | 929 | 54.3 | 49.2 | 90.6 | |
| 77 | 2100 | 280 | 86.7 | | | | | |

[a]BOD value (mg/l)

The examples which follow illustrate one embodiment of the BOD apparatus of the present invention.

EXAMPLE 8

A two-liter reagent bottle with a side arm at the bottom was connected, via a length of Tygon tubing attached to the side arm, to the inlet port of a Fluid Metering, Inc. Model RP G-6 pump (Fluid Metering, Inc., Oyster Bay, N.Y.). The outlet port of the pump was attached, again via Tygon tubing, to the bottom of a vertically-mounted 9×150 mm. Fisher and Porter chromatographic column (obtained from Arthur H. Thomas Co., Philadelphia, Pa.). The column was charged with 6.5 g. of the CGZ carrier described in Example 1. The top of the column was connected by Tygon tubing to the inlet port of a cell having sealably mounted therein the dissolved oxygen sensor of a Diffusion Oxygen Analyzer (International Biophysics, Corp., Irvine, Cal.). The output port of the cell was connected with Tygon tubing to a receiving vessel. Another dissolved oxygen sensor was placed in the reagent bottle which served as a waste stream reservoir. Each dissolved oxygen sensor was standardized against air-saturated water at 21.9% saturation.

The column was seeded by continuously recirculating a volume of sewage through the column at a flow rate of 1 ml./min. for five days. A sterile, standard BOD solution containing 150 mg/liter each of glutamic acid and glucose was passed through the column at 0.37 ml/min. for 24 hours as a preconditioning to insure adequate bioaccumulation prior to collecting oxygen uptake data. The standard BOD solution then was passed through the column or immobilized aerobic microbe bioreactor. The effluent percent saturation was measured at three different flow rates. In each case, the percent saturation of the feed in the reservoir was 21.9% and the effluent percent saturation reading stabilized within 20-60 min. after changing the flow rate. The results are summarized in Table XIII.

TABLE XIII

Oxygen Uptake in an Aerobic Bioreactor BOD Apparatus

| Flow Rate (ml./min.) | Effluent % Saturation |
|---|---|
| 0.19 | 7[a] |
| 0.37 | 10 |
| 2.07 | 18.5 |

[a]Decreased to 4.5 after an additional 12 hours.

From Table XIII, it is apparent that oxygen uptake is inversely proportional to the flow rate. Oxygen uptake, expressed as the percentage of dissolved oxygen consumed, is summarized in Table XIV and was calculated in accordance with the following formula:

$$\% \text{ O}_2 \text{ consumed} = \frac{\text{Feed \% Sat'n} - \text{Eff. \% Sat'n}}{\text{Feed \% Sat'n}} \times 100$$

TABLE XIV

Percentage of Dissolved Oxygen Consumed In An Aerobic Bioreactor BOD Apparatus

| Flow Rate, ml./min. | % O₂ Consumed |
|---|---|
| 0.19 | 68[a] |
| 0.37 | 54 |
| 2.07 | 16 |

[a]Increased to 79% after an additional 12 hours.

EXAMPLE 9

The procedure of Example 8 was repeated, except that the column was seeded with 200 ml. of an overnight tryptic soy broth culture of Escherichia coli ($10^9$ cells/ml.) and the standard BOD solution was replaced with sterile broth. After the 24-hour preconditioning period, the effluent percent saturation was measured and found to be 0%; the broth percent saturation originally was 21.9%. Thus, 100% of the dissolved oxygen was consumed.

Examples 8 and 9 clearly demonstrate the feasibility of measuring a difference in an organic waste-containing aqueous medium, which difference is the result of biochemical conversions (oxidations) taking place in the BOD apparatus aerobic bioreactor.

Such a measurable difference then is readily correlated to BOD by known procedures. For one example of such a correlation, see I. Karube et al., Biotechnol. Bioeng., 19, 1535 (1977). Thus, for a given aerobic bioreactor, passing standard solutions having varying concentrations of organic material at a given flow rate will yield a set of, for example, oxygen uptake data. The BOD values of such standard solutions can be determined by conventional methods to give a set of conventional BOD values. The two sets of data then can be combined in graph form to give a standard curve for each flow rate employed. The BOD of any organic waste in an aqueous medium then is determined quickly and simply by passing such aqueous medium through the BOD apparatus and comparing the data obtained with the appropriate standard curve.

I claim:

1. A method for continuously processing biodegradable organic waste in an aqueous medium which comprises continuously serially passing an organic waste-containing aqueous medium through a first immobilized microbe bioreactor and a second immobilized microbe bioreactor, in which:

A. The first bioreactor is a hydrolytic redox bioreactor containing a porous inorganic support having a pore diameter distribution of from about 0.8 to about 30μ and microbes immobilized within the pores thereof, in which bioreactor the dissolved oxygen originally present in the aqueous medium is substantially depleted, and B. the second bioreactor is an anaerobic bioreactor containing a porous inorganic support having a pore diameter distribution of from about 0.8 to about 30μ and microbes immobilized within the pores thereof, in which bioreactor oxygen is substantially absent.

2. The method of claim 1 in which the anaerobic bioreactor has a gas removal means attached thereto.

3. The method of claim 1 in which the hydrolytic redox bioreactor is maintained at a temperature of from about 10° C. to about 60° C.

4. The method of claim 3 in which the temperature is from about 30° C. to about 40° C.

5. The method of claim 1 in which at least 70 percent of the pores of the inorganic support of the hydrolytic redox bioreactor have diameters at least as large as the smallest major dimension, but less than about five times the largest major dimension, of the microbes present in the hydrolytic redox bioreactor.

6. The method of claim 1 in which the inorganic support of the hydrolytic redox bioreactor is a cordierite material.

7. The method of claim 6 in which the cordierite inorganic support has a pore diameter distribution of from about 2 to about 9μ, and an average pore diameter of about 4.5μ.

8. The method of claim 1 in which the inorganic support of the hydrolytic redox bioreactor is a halloysite or kaolinite material.

9. The method of claim 8 in which the inorganic support has a pore diameter distribution of from about 0.4 to about 6μ and an average pore diameter of about 4.5μ.

10. The method of claim 8 in which the inorganic support has an average pore diameter of about 6μ.

11. The method of claim 8 in which the inorganic support has a pore diameter distribution of from about 2 to about 15μ and an average pore diameter of about 9μ.

12. The method of claim 1 in which at least 70 percent of the pores of the inorganic support of the anaerobic bioreactor have diameters at least as large as the smallest major dimension, but less than about five times the largest major dimension, of the microbes present in the anaerobic bioreactor.

13. The method of claim 1 in which the inorganic support of the anaerobic bioreactor is a cordierite material.

14. The method of claim 13 in which the cordierite inorganic support has a pore diameter distribution of from about 2 to about 9μ, and an average pore diameter of about 4.5μ.

15. The method of claim 1 in which the inorganic support of the anaerobic bioreactor is a halloysite or kaolinite material.

16. The method of claim 15 in which the inorganic support has a pore diameter distribution of from about 0.4 to about 6μ and an average pore diameter of about 4.5μ.

17. The method of claim 15 in which the inorganic support has an average pore diameter of about 6μ.

18. The method of claim 15 in which the inorganic support has a pore diameter distribution of from about 2 to about 15μ and an average pore diameter of about 9μ.

19. The method of claim 1 in which the principal product is ethanol which is a constituent of the liquid effluent emerging from the anaerobic bioreactor.

20. A method for processing biodegradable organic waste in an aqueous medium which comprises serially passing an organic waste-containing aqueous medium through a first immobilized microbe bioreactor and a second immobilized microbe bioreactor, in which:

A. the first bioreactor is a hydrolytic redox bioreactor containing a porous inorganic support which is suitable for the accumulation of a biomass, and B. the second bioreactor is an anaerobic bioreactor comprising a controlled-pore, hydrophobic inorganic membrane which contains a porous inorganic support which is suitable for the accumulation of a biomass, in which at least about 90 percent of the pores of the inorganic membrane have diameters of from about 100 Å to about 10,000 Å.

21. The method of claim 20 in which the anaerobic bioreactor is sealably enclosed within a jacket having a gas removal means attached thereto.

22. The method of claim 20 in which the hydrolytic redox bioreactor is maintained at a temperature of from about 10° C. to about 60° C.

23. The method of claim 22 in which the temperature is ambient temperature.

24. The method of claim 22 in which the temperature is from about 30° C. to about 35° C.

25. The method of claim 20 in which the inorganic support of the hydrolytic redox bioreactor is a porous, high surface area inorganic support which is suitable for the accumulation of a high biomass surface within a relatively small volume.

26. The method of claim 25 in which at least 70 percent of the pores of the inorganic support have diameters at least as large as the smallest major dimension, but less than about five times the largest major dimension, of the microbes present in the hydrolytic redox bioreactor.

27. The method of claim 25 in which the average diameter of the pores of the inorganic support is in the range of from about 0.8 to about 220μ.

28. The method of claim 27 in which the inorganic support is a cordierite material.

29. The method of claim 28 in which the cordierite inorganic support has a pore diameter distribution of from about 2 to about 9μ, and an average pore diameter of about 4.5μ.

30. The method of claim 20 in which the inorganic support of the anaerobic bioreactor is a porous, high surface area inorganic support which is suitable for the accumulation of a high biomass surface within a relatively small volume.

31. The method of claim 30 in which at least 70 percent of the pores of the inorganic support have dimensions at least as large as the smallest major dimension, but less than about five times the largest major dimension, of the microbes present in the anaerobic reactor.

32. The method of claim 30 in which the average diameter of the pores of the inorganic support is in the range of from about 0.8 to about 220μ.

33. The method of claim 32 in which the inorganic support is a cordierite material.

34. The method of claim 33 in which the cordierite inorganic support has a pore diameter distribution of from about 2 to about 9μ, and an average pore diameter of about 4.5μ.

35. The method of claim 20 in which the pore diameter range of the pores of the inorganic membrane of the anaerobic bioreactor is from about 1,500 A to about 6,000 A.

36. The method of claim 35 in which the inorganic membrane is composed of a material which is selected from the group consisting of glass, spinel, silica, and alumina.

37. The method of claim 35 in which the membrane is rendered hydrophobic by a post-formation treatment with octadecyltrichlorosilane.

38. The method of claim 20 in which an additional microbe colony is established on the gas-space side of the inorganic membrane of the anaerobic bioreactor.

39. The method of claim 20 in which a principal product is methane which is passed through the controlled-pore, hydrophobic inorganic membrane of the anaerobic bioreactor.

* * * * *